United States Patent
Peterson

[11] 3,790,216
[45] Feb. 5, 1974

[54] WEDGE LOCKING WHEEL MOUNTING

[75] Inventor: Walter R. Peterson, Plainfield, Ill.

[73] Assignee: Peterson Manufacturing Company, Plainfield, Ill.

[22] Filed: Nov. 21, 1972

[21] Appl. No.: 308,504

[52] U.S. Cl. .................................. 301/1, 287/52.06
[51] Int. Cl. ..... B60b 37/04, B60b 27/06, F16d 1/08
[58] Field of Search .. 301/1, 128; 287/52.04, 52.05, 287/52.06

[56] References Cited
UNITED STATES PATENTS

| | | | |
|---|---|---|---|
| 3,279,831 | 10/1966 | Smelcer | 301/1 |
| 3,302,959 | 2/1967 | Smelcer | 301/1 |
| 3,312,486 | 4/1967 | Hartdegen | 301/1 |
| 3,404,908 | 10/1968 | Palmer | 301/1 |
| 3,430,992 | 3/1969 | Palmer | 287/52.06 |
| 3,454,305 | 7/1969 | Gilmour | 301/1 |
| 3,476,416 | 11/1969 | Gilmour | 301/1 |
| 3,679,247 | 7/1972 | Peter | 287/52.06 |

Primary Examiner—Richard J. Johnson
Assistant Examiner—Reinhard Eisenzopf
Attorney, Agent, or Firm—Kenneth T. Snow

[57] ABSTRACT

A mounting construction for a wheel to an axle wherein a hub assembly on the wheel includes wedge members arranged for axial separation by a differential bolt to thereby effect a radial gripping of the wedge members with the axle. The wheel is thus securely locked to the axle and yet may be conveniently removed even after extended periods of time when the wedges are in locked position.

9 Claims, 3 Drawing Figures

WEDGE LOCKING WHEEL MOUNTING

BACKGROUND OF THE INVENTION

1. Field of the Invention

The mounting and fastening of wheels to vehicle axles has been a problem since wheeled vehicles were developed. In recent years tractors have been made larger and more powerful and to fully utilize this increase in power the wheels have been made larger resulting in the transmission of greater traction. The mounting of these large wheels on tractor drive axles thus becomes even more critical with the tremendous loads imposed on the juncture between wheel and axle. The mounting and fastening means have gone through an evolution from simple clamp means in the beginning to very complex sophisticated means on present day tractors. Some of these current structures are difficult to assemble and most of them defy removal after they have been on for any substantial periods of time.

The mounting of tractor wheels on axles becomes an even more demanding requirement when dual wheels are to be carried on the tractor drive axle or an extension thereof. Obviously the torque loads imposed on the mountings are greatly increased when additional wheels are used to gain increased traction.

The present invention provides for the convenient locking of a wheel onto an axle and probably more importantly provides for the convenient breaking loose of the wedge locking elements after extended periods of use of the tractor with the wheel wedges locked on the tractor axle.

2. Description of the Prior Art

The wheel mounting structures utilized by the tractor and wheel manufacturers have been carefully reviewed as well as the structures disclosed in prior patents in this field.

The U.S. Pat. to Gilmour, Jr., No. 3,454,305 shows and describes a split ring clamp for joining a wheel to an axle.

The Gilmour, Jr. U.S. Pat. No. 3,476,416 shows a two piece axle clamping device for fastening a wheel to an axle.

The U.S. Pat Nos. to:
Smelcer et al   3,279,831
Smelcer   3,302,959
Hartdegen   3,312,486
Palmer   3,404,908
Palmer   3,430,992
all show and describe various forms of wedges in various embodiments for effecting a mounting and a fastening of a wheel to an axle. Some employ a single wedge and others pairs of wedges. All are designed to function with what appears to be a cast hollow hub through which a tractor axle is journaled. In these prior patents the central hub structure has the wheel disc located centrally thereof whereas in the subject invention the wheel disc is carried at one end of a fabricated hub structure.

The patents to Smelcer et al and both Palmer patents show pairs of wedge members to effect a locking of those wedge members by bringing them inwardly toward each other whereas the subject invention spreads a pair of wedges to lock a wheel to an axle. Smelcer et al also discloses the use of a bolt with two diameters of shank and oppositely disposed threads to cause the wedge members to be pulled together. In contradistinction the subject invention employs a differential bolt with threads running in the same direction but with different pitches.

SUMMARY OF THE INVENTION

A principal object of this invention is to provide a novel wedge locking for a vehicle wheel to a drive axle.

An important object of this invention is the provision of a novel hub structure for a tractor wheel to facilitate the convenient mounting of the wheel onto drive axles of different diameters.

Another important object of this invention is to provide a novel wedge locking of a wheel hub to an axle.

Still another important object of this invention is to provide in the device of the preceding object a pair of axially aligned wedge members arranged with outwardly extending and radially inwardly inclined wedge surfaces for engagement with comparably inclined surfaces in the wheel hub.

Another and still further important object of this invention is to provide a novel differential bolt member for effecting movement of the wedge members of the preceding object axially outwardly to cause clamping of the wheel to the axle and axially inwardly for causing a relieving of the wheel clamping.

Still another important object of this invention is to provide in the device of the preceding objects an intermediately disposed stop member between the wedge members to cause both members to be broken loose from their wedge clamping positions.

Other and further important objects and advantages of this invention will become apparent from the disclosures in the following specification and accompanying drawings.

IN THE DRAWINGS

AS SHOWN IN THE DRAWINGS

Figure 1:
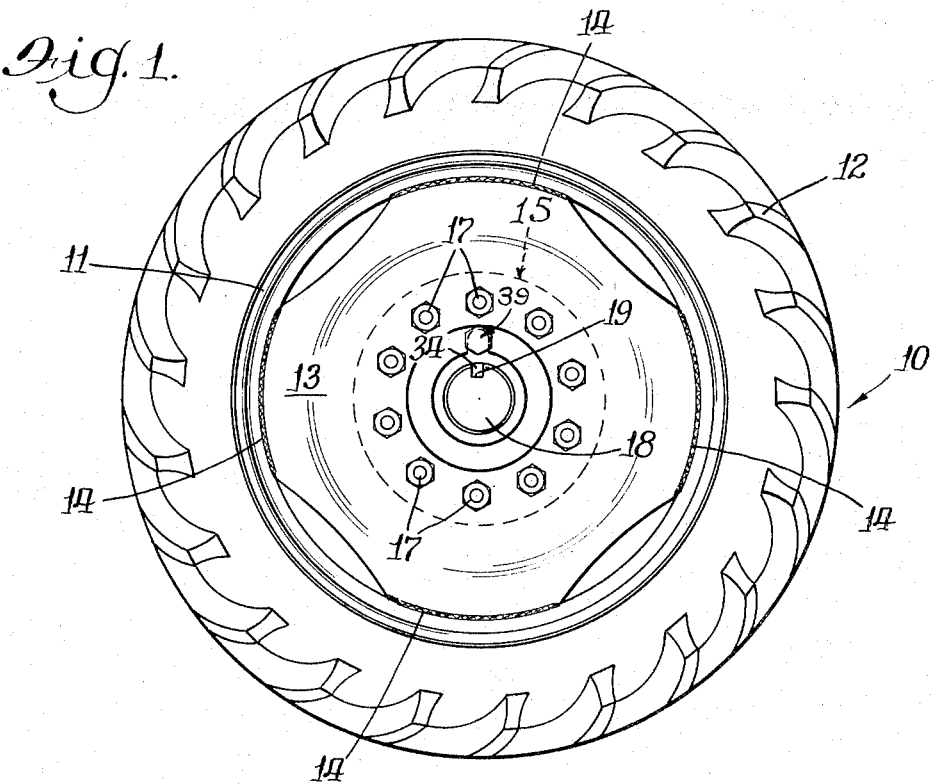
FIG. 1 is a side elevational view of a tractor wheel incorporating the device of this invention.

The reference numeral 10 indicates generally a vehicle wheel such as a tractor wheel. The wheel 10 includes a rim 11, a pneumatic tire 12 mounted on the rim, a wheel disc 13, arcuately spaced welds 14 holding the rim to the wheel disc 13, and a central hub structure defined generally by the numeral 15.

The hub is equipped with a radially disposed rigid ring member 16 to which the wheel disc is attached by means of bolts 17. The bolts 17 are arranged in a circular path around the ring 16 as best shown in FIG. 1.

The tractor includes a drive axle 18 on which the wheel 10 is carried. The axle 18 is provided with an elongated keyway 19 extending along the length of the axle. It is to this keyway that the wheel is locked for simultaneous rotation.

Figure 3:
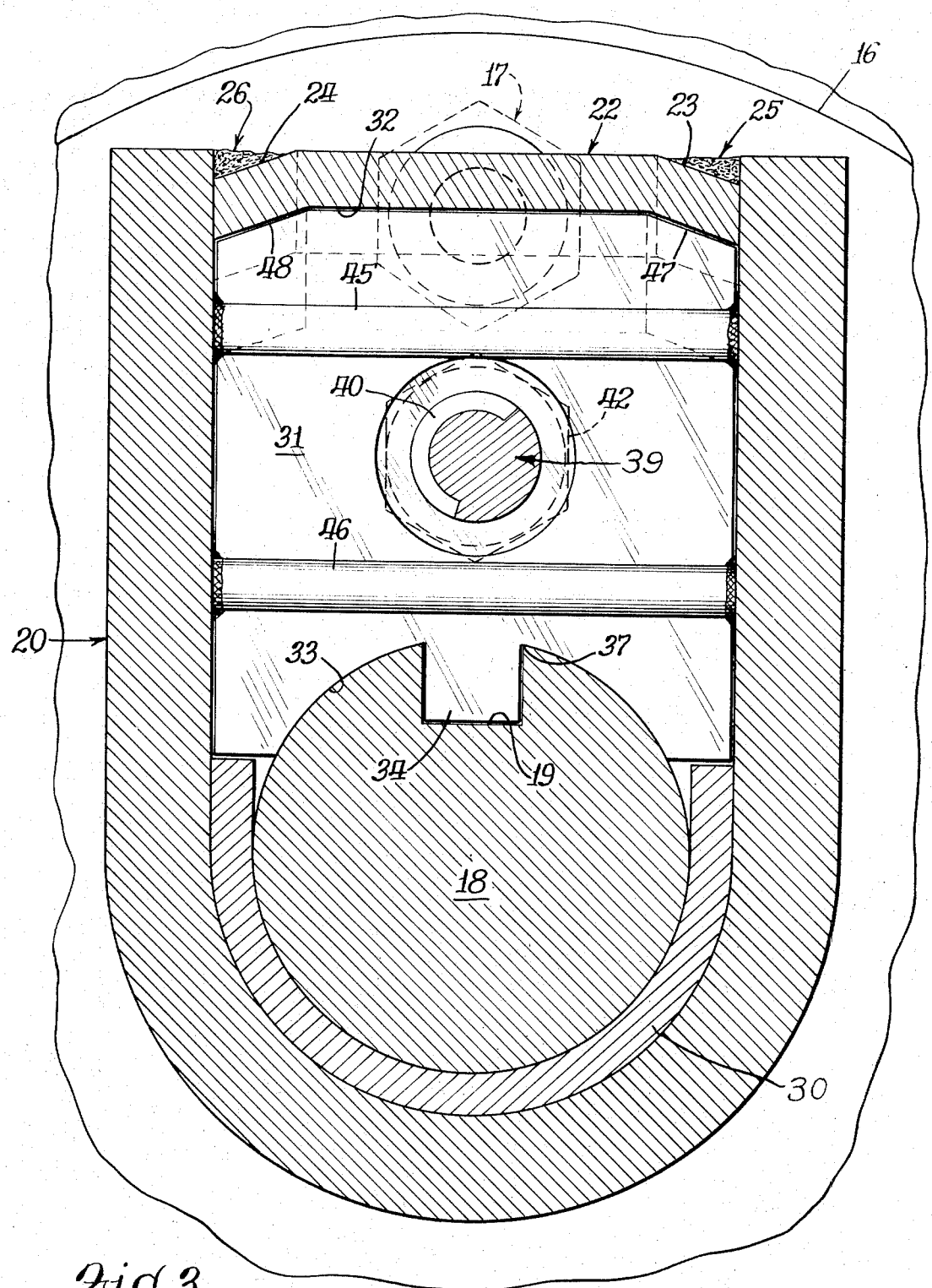
FIG. 3 is an enlarged sectional view taken on the line 3—3 of FIG. 2.

The central hub structure 15 may be a casting or weld fabricated as shown in the drawings. A U-shaped frame 20 has substantial width and together with the ring 16 constitutes the axial length of the hub 15. One side of the U-shaped frame 20 is welded at 21 to the ring 16. The other side of the U-shaped member 20 is disposed away from the ring 16 and is open and unattached. A bridge designated generally as 22 is arranged and constructed to span the tops of the walls of the U-shaped frame 20. As best shown in FIG. 3 the side edges 23 and 24 of the bridge 22 are inclined downwardly and outwardly to their juncture with the U-walls. Welds 25 and 26 are employed to fixedly join the bridge 22 to the U-shaped frame 20.

Figure 2:
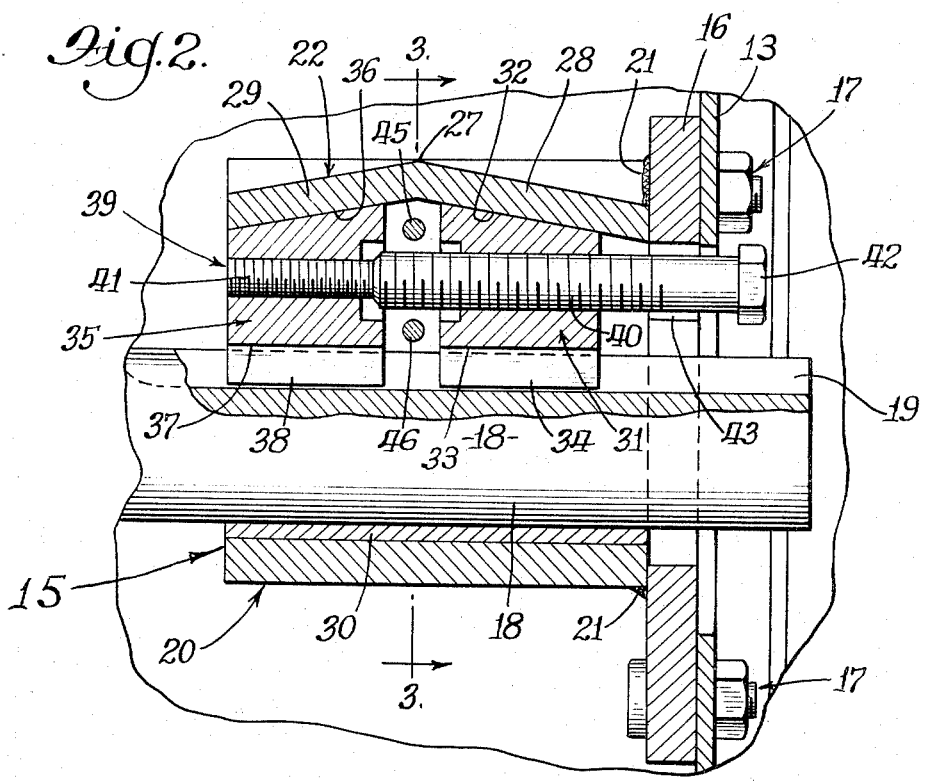
FIG. 2 is a sectional view taken on the line 2—2 of FIG. 1.

As best shown in FIG. 2 the bridge 22 in its longitudinal direction is provided with an apex 27 in substantially the center thereof. On one side of the apex 27 is a first wall 28 which is inclined radially and axially inwardly to its abutment with the hub ring 16. A second wall 29 joins the wall 28 at the apex 27 and that second wall is inclined radially inwardly and axially outwardly. The outer end of the wall 28 is substantially coextensive with the outer free end of the U-shaped frame 20.

A substantially semi-cylindrical liner or spacer 30 is provided as necessary within the arcuate bottom portion of the U-shaped frame 20 to permit mounting of this wheel structure on axles of different diameters. If the axle were of a larger diameter the spacer 30 would be reduced in thickness or eliminated altogether. Or, if the axle were smaller in diameter the thickness of the spacer would be accordingly increased to accommodate the smaller axle. It is of course desirable to a successful use of this wheel mounting to have the axle snuggly engaging the arcuate bottom portion of the U-shaped frame or any spacer used therein.

The fabricated hub structure 15 is provided with a first wedge member 31. The top 32 of the wedge 31 is inclined radially and axially inwardly. The inclination of the top wall of the wedge 31 is substantially the same as the inclination of the bridge wall 28. The bottom 33 of the wedge member 31 is concave to substantially match the curvature of the axle 18 on which the wedge is located. Centrally of the bottom 33 is an axially extending key or tongue 34 which is adapted to slidably engage the keyway 19 of the axle 18. The member 34 may be a separate key or an integral tongue as desired.

The hub 15 includes a second wedge member 35 which is axially aligned with but spaced apart from the first wedge member 31. The top 36 of the second wedge member 35 is inclined radially inwardly and axially outwardly. Thus the wedge tops are inclined opposite to one another in the axial direction. The inclination of the top wall 36 is substantially the same as the inclination of the bridge wall 29. The bottom of the wedge 35 is also concave and substantially matches the curvature of the axle 18 in the same manner as the bottom 33 of the first wedge member 31. Thus both concave surfaces snuggly engage the tractor drive axle 18. A centrally disposed and axially extending key or tongue 38 on the bottom 37 of the wedge 35 is adapted to slidably engage the keyway 19 of the axle 18.

A differential bolt designated generally by the numeral 39 is provided with a first large diameter shank portion 40. The shank portion 40 is provided with large long pitched threads which are arranged and constructed to engage a longitudinally extending internally threaded bore in the first wedge member 31. The bolt 39 is also provided with a second smaller diameter shank portion 41. This smaller diameter shank portion 41 is provided with small short pitched threads. The smaller diameter shank portion threadedly engages a longitudinally extending internally threaded bore in the second wedge member 35. The bores in the two wedge members are axially aligned. The bolt 39 is provided with an operating head 42 which is located on the side of the ring 16 to which the wheel disc is mounted. The shank portions of the bolt 39 freely pass through a notch 43 in the ring 16 and below the inner circumference of the wheel disc 13. The bolt head 42 or the shank portions 40 and 41 do not engage either the ring or the disc. The wedge members with the differential bolt 39 may thus have limited axial movement within the central wheel hub 15.

Stationary means in the form of pins 45 and 46 are fixedly disposed between the legs of the U-shaped frame 20 and loosely extend between the inner adjoining ends of the wedge members 31 and 35. It is these pin members 45 and 46 located above and below the bolt 39 respectively that permit a positive breaking of the wedge clamping surfaces when it is desired to remove the wheel from the axle.

THE OPERATION OF THE DEVICE

In preparation for the mounting of the wheel the hub structure assembly 15 has its wedge members 31 and 35 drawn axially together so they substantially abut the stationary pin members 45 and 46. The hub 15 is then slid axially on the tractor axle 18 with the keys 34 and 38 of the wedge members engaging the keyway slot 19. When the hub reaches its desired position the operating head 42 of the differential bolt 39 is rotated by a suitable wrench in a normally tightening or closing direction for right handed threads. Thus, as the differential bolt 39 is tightened the wedge members 31 and 35 shift along the bolt in the same direction. However, because of the differential in the pitches of the threads the wedge members, although moving in the same direction, separate axially on the bolt causing the inclined surfaces to lock and impart a radial reaction of the keys 34 and 38 with the keyway slot 19. The fabricated hub structure 15 is thus securely and conveniently locked to the tractor axle 18. Now, the wheel disc is mounted on the end ring 16 of the hub and the bolts 17 tightened to make the wheel and hub a unitary structure.

It is important to note the operating head 42 of the differential bolt 39 is open for free accessibility on the outside of the wheel. When it is desired to remove the wheel a wrench is applied to the head 42 and the bolt "unscrewed." This causes the wedges to move toward the center of the hub structure 15 until they abut the stationary pin members 45 and 46. If the wheel has been assembled and in use for some time the inclined wedged surfaces tend to "seize" and it is usually difficult to break this seizure. The stationary pin means permits the pulling of the bolt by force to centrally position the wedges 31 and 35. If one wedge is released first and strikes the stationary pins 45 and 46 the axial force is then all applied to the other wedge until the seizure of that other wedge is broken loose. This action is possible because the differential bolt 39 with its two wedge members is floatingly independent of the hub structure and can shift axially within certain limits. There is thus provided a conveniently mounted and dismounted tractor wheel to a drive axle regardless of its size and regardless of the horsepower available in that tractor.

I am aware that numerous details of construction may be varied throughout a wide range without departing from the principles disclosed herein and I therefore do not propose limiting the patent granted hereon otherwise than as necessitated by the appended claims.

What is claimed is:

1. A wheel mounting for a vehicle axle of the type having a keyway extending axially of the axle, comprising a ring member, means joining one side of said ring member to a wheel, a U-shaped member affixed to the other side of said ring member and encompassing the vehicle axle, a bridge spanning the legs of the U-shaped member and fixed thereto, said bridge having a generally centrally disposed apex and radially inwardly tapering surfaces extending axially outwardly in both directions from said apex, a pair of wedge members in axial alignment within said U-shaped member, means cooperating with the underside of each of said wedge members and the keyway in said axle to permit axial sliding of the wedge members relative to the axle and to insure concurrent rotation of the wedge members with the axle, the top sides of said wedge members being tapered in opposite directions and arranged and constructed to mate with the tapered surfaces of said bridge, and means for spreading the wedge members axially apart to cause a locking engagement of the U-shaped member and its bridge with the vehicle axle.

2. A device as set forth in claim 1 in which said means cooperating comprises tongues on the wedge members for engagement with the keyway in said axle.

3. A device as set forth in claim 1 in which said wedge members are shorter in length than the tapered surfaces of the bridge.

4. A device as set forth in claim 1 in which said means for spreading the wedge members comprises a differential bolt member.

5. A device as set forth in claim 4 in which said differential bolt member has its shank extending parallel to and through both of said wedge members, one portion of said shank having relatively large pitch threads for engagement with one of said wedge members and another portion of said shank having relatively smaller pitch threads for engagement with the other of said wedge members, whereby rotation of said bolt member causes said wedge members to move at different rates of speed on the bolt member.

6. A device as set forth in claim 1 in which said means for spreading the wedge members comprises a differential bolt member having a shank extending parallel to the axle and through both of said wedge members, said shank having a relatively large diameter portion and a relatively small diameter portion, said large diameter portion having relatively large threads on the outer surface thereof, said small diameter portion having relatively small threads on the outer surface thereof, both of said threads having the same direction, one of said wedge members having large internal threads for threadedly receiving the large diameter threaded shank portion of the differential bolt member and the other of said wedge members having small internal threads for threadedly receiving the small diameter threaded shank portion of the differential bolt member, whereby when the differential bolt member is rotated both wedge members will move in the same direction on the differential bolt member but the one having the large diameter and large threads will move at a faster rate to thereby cause the wedge members to effectively separate or come together and when separating will wedge against the tapered bridge surfaces.

7. A device as set forth in claim 6 in which means is provided for rotating said differential bolt member.

8. A device as set forth in claim 7 in which said means for rotating comprises an operating head member located on the side of said ring member to which the wheel is attached.

9. A device as set forth in claim 6 in which stationary means spans the legs of the U-shaped member between the wedge members to thereby prevent the wedge members from abutting one another at the center and to facilitate the breaking of the wedge members loose from their engagement with the tapered surfaces of the bridge, especially after long periods of engagement.

* * * * *